(12) United States Patent
McKinney

(10) Patent No.: US 10,623,473 B2
(45) Date of Patent: Apr. 14, 2020

(54) WASTEWATER USE AND MONITORING SYSTEM

(71) Applicant: Jerry L. McKinney, Silsbee, TX (US)

(72) Inventor: Jerry L. McKinney, Silsbee, TX (US)

(*) Notice: Subject to any disclaimer, the term of this patent is extended or adjusted under 35 U.S.C. 154(b) by 305 days.

(21) Appl. No.: 14/569,266

(22) Filed: Dec. 12, 2014

(65) Prior Publication Data

US 2015/0100169 A1 Apr. 9, 2015

Related U.S. Application Data

(63) Continuation-in-part of application No. 13/871,339, filed on Apr. 26, 2013, now Pat. No. 9,499,412, and a continuation-in-part of application No. 13/194,525, filed on Jul. 29, 2011.

(60) Provisional application No. 61/368,813, filed on Jul. 29, 2010, provisional application No. 61/375,673, filed on Aug. 20, 2010.

(51) Int. Cl.
*H04L 29/08* (2006.01)
*C02F 1/00* (2006.01)

(52) U.S. Cl.
CPC .............. *H04L 67/10* (2013.01); *C02F 1/008* (2013.01); *C02F 2209/42* (2013.01); *C02F 2303/14* (2013.01)

(58) Field of Classification Search
None
See application file for complete search history.

(56) References Cited

U.S. PATENT DOCUMENTS

| | | | |
|---|---|---|---|
| 3,875,051 A | 4/1975 | Kovarik | |
| 4,803,632 A * | 2/1989 | Frew | G01D 4/006 340/12.32 |
| 4,822,213 A * | 4/1989 | Grace | E03F 5/22 137/363 |
| 5,403,498 A | 4/1995 | Morissey et al. | |
| 5,482,630 A * | 1/1996 | Lee | C02F 3/006 119/260 |
| 5,498,330 A | 3/1996 | Delle Cave | |
| 5,647,986 A | 7/1997 | Nawathe et al. | |
| 6,669,839 B2 | 12/2003 | Tipton et al. | |
| 6,977,351 B1 * | 12/2005 | Woytowitz | A01G 25/167 200/61.04 |
| 7,149,701 B2 | 12/2006 | McKinney | |
| 7,525,420 B2 | 4/2009 | McKinney | |
| 7,945,471 B2 | 5/2011 | McKinney | |
| 8,386,303 B2 | 2/2013 | McKinney | |
| 2004/0230455 A1 | 11/2004 | McKinney | |
| 2005/0021359 A1 | 1/2005 | McKinney | |
| 2005/0274656 A1 * | 12/2005 | McKinney | C02F 1/008 210/86 |
| 2007/0021971 A1 | 1/2007 | McKinney et al. | |

(Continued)

*Primary Examiner* — Richard C Gurtowski
(74) *Attorney, Agent, or Firm* — Bushman Werner, P.C.

(57) ABSTRACT

A wastewater reuse system has a wastewater treatment system connected to a dwelling for receiving wastewater therefrom. The wastewater treatment system has a pump tank with an outlet that can be connected to a central wastewater collection system and/or a reuse recipient of treated wastewater, such as an irrigation system. A monitoring system for tracking the water used and/or reused by a dwelling. The monitoring system using a dialer system to transmit operating data to a server which is configured to determine the amount of water used and/or reused by a dwelling.

46 Claims, 11 Drawing Sheets

(56) References Cited

U.S. PATENT DOCUMENTS

| | | |
|---|---|---|
| 2007/0106525 A1 | 5/2007 | McKinney |
| 2007/0106527 A1 | 5/2007 | McKinney |
| 2009/0014383 A1* | 1/2009 | Owley .................. C02F 3/04 210/605 |
| 2009/0026132 A1 | 1/2009 | Costa |
| 2011/0088315 A1 | 4/2011 | Donoghue |
| 2013/0243614 A1 | 9/2013 | Moon |

* cited by examiner

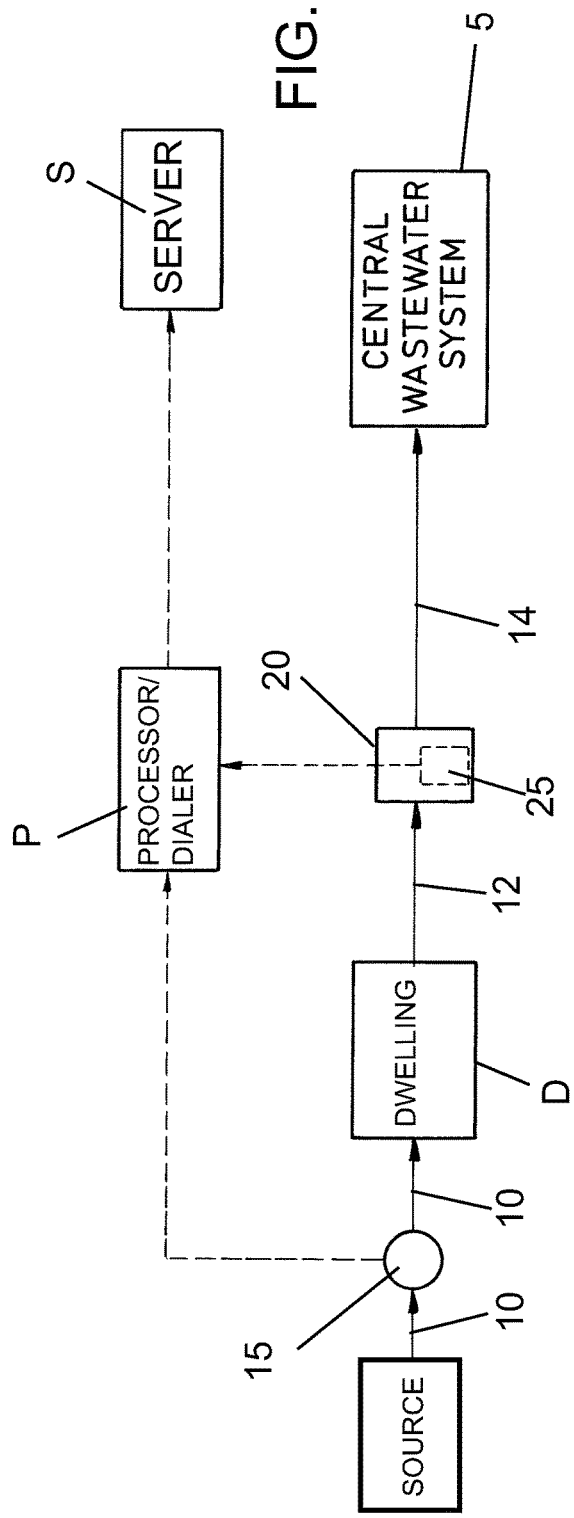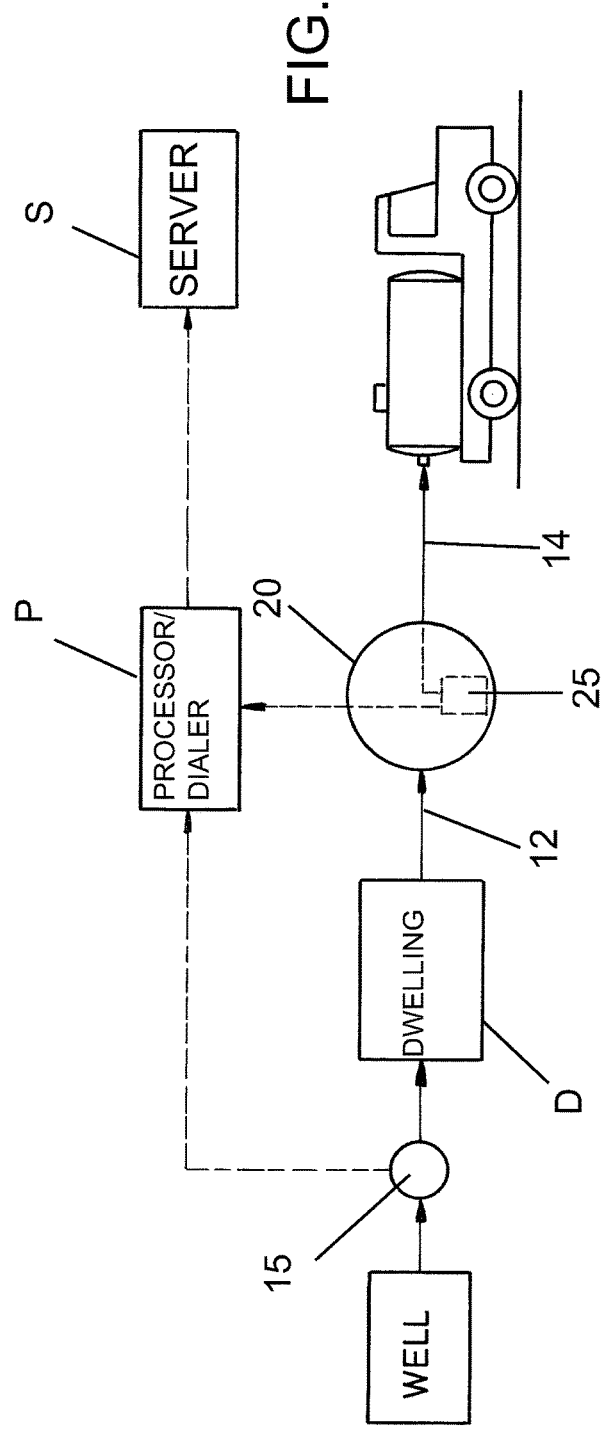

WASTEWATER USE AND MONITORING SYSTEM

CROSS REFERENCE TO RELATED APPLICATION

This application is a continuation-in-part of U.S. application Ser. No. 13/871,339, filed Apr. 26, 2013 and this application is a continuation-in-part of U.S. application Ser. No. 13/194,525 filed Jul. 29, 2011, which in turn claims priority to U.S. application Ser. Nos. 61/368,813 filed Jul. 29, 2010, and 61/375,673 filed Aug. 20, 2010, the disclosures of all the above listed applications being incorporated herein by reference for all purposes.

FIELD OF THE INVENTION

The present invention relates to reducing and monitoring water usage and, more particularly, to the monitoring of the use and reuse of wastewater from a dwelling or other source.

BACKGROUND OF THE INVENTION

In general, there are three basis ways that wastewater from a wastewater generating source; e.g., home, business or the like can be disposed of, namely;
(1) direct connection to a municipal wastewater treatment system;
(2) use of a septic system; and
(3) use of an advanced or secondary wastewater treatment system; e.g., an aerobic wastewater treatment system.

For purposes of the following description, while the words homes, residences or dwellings may be employed, it will be understood that the words include commercial establishments, restaurants and the like.

Municipal Wastewater Treatments System (MWS)

Residences located in cities, for the most part, use system (1) above; i.e., direct connection to an MWS. As cities grow in population and/or expand geographically, the number of users of the MWS increases, sometimes to the point where the MWS becomes overloaded, which in certain cases is addressed by adding more capacity to existing MWS or building more MWS. Perhaps more important, in cases where, particularly in the present economic climate, cities and other municipalities do not have the funds to increase the size and/or number of MWS, it is not infrequent that inadequately treated wastewater is released into streams; e.g., rivers, creeks, bayous, etc., leading to severe environmental problems. Indeed, even under the best of circumstances, treated wastewater from MWS is now routinely discharged into such streams and, even though it has gone through a treatment process, it is generally not free of residual bacteria.

Another problem with the use of an MWS as the sole means of treating residential wastewater is that increasingly scarce, fresh water is wasted. This can be a particular problem in municipalities in climates where annual rainfall is meager and municipal, potable water for homeowners comes from lakes, streams, underground aquifers, etc. Indeed, in such arid climates, conservation of fresh water is of the utmost importance because of its scarcity.

Overall, the use of MWS is costly, typically has negative environmental impact and contributes to waste of potable water.

Septic System (SSS)

In the second method of disposing of wastewater, i.e., an SSS, the wastewater typically flows from the home to a pretreatment/settling tank, where solids settle, clarified water passing to a pump tank or other such holding tank from which it is discharged either to a drain field, sprinkler system, or the like. An SSS solves the problem of overloading the MWS because the wastewater stays on site, and minimizes the use of potable water resources. However, if the treated wastewater is used for irrigation, it is subject to upsets caused by heavy rain and/or periodic over capacity usage.

An SSS system also suffers from the disadvantage that the treated water therefrom may pass to a drain field or the like, which because of soil conditions or capacity, does not allow for the absorption of all the wastewater. Not every system has sufficient land available to use all the wastewater. In some cases, only 1/10 the amount of water being used is actually sent to and absorbed in the land. Additionally, if an SSS fails for some reason, typically there is no backup. As a result, sewage or wastewater can spill onto land, backup into the residence, etc. If the soil in the drain field employed with the SSS becomes saturated with organic material, and again depending upon soil conditions, the treated water from the SSS will not be sufficiently absorbed, and because there is no backup system, an environmental problem can be posed.

Advanced Wastewater Treatment System (AWTS)

There are various types of advanced wastewater treatment systems, as for example, an aerobic wastewater treatment system (ATS), evaporation-transpiration (ET) septic systems, septic media filters, mound septics, raised beds septics, pressure dosing septic systems, sand bed filters, peat beds, etc.

In an ATS, the wastewater from the home or the like flows to a pretreatment/settling tank, clarified water passing from the settling tank into an aerobic treatment tank, where most remaining solids in the clarified water from the settling tank are digested by means of aerobic activity, the aerobically treated, clarified wastewater then passing to a pump tank or other holding tank for discharge to a drain field, sprinklers, and/or streams. An ATS has advantages over an SSS in that, treated wastewater can be more easily disinfected which, if done, results in a wastewater having a low bacteria count, thus making it safer when being discharged into streams. However, an ATS is subject to some of the same disadvantages experienced by the SSS as to poor soil conditions in the irrigation field, extreme rainfall and no fail-proof backup system. Like an SSS, it also conserves fresh water if the treated wastewater is used for irrigation.

In the case of either the SSS or the AWTS, when the water discharged from either of those systems goes to a drain field, for irrigation or the like, there must be enough available land; e.g., yard, greenbelt, etc., to handle all the treated water. For example, in Houston there may be a building which produces 10,000 gallons of wastewater and which has enough land to absorb 6,000 gallons of it whereas that same building in Los Angeles may only have sufficient land to absorb 500 gallons of water. The type of land matters as well. Sandy, loamy, and otherwise porous land is good at absorbing wastewater. Hard, rock, or clay, land though is not very absorbent.

Commonly, to supply fresh or potable water to residences, businesses, houses, etc., in or near cities, towns or other such relatively densely populated areas, raw water from a source; e.g., a river, reservoir, etc., is treated; e.g., chlorinated, so as to be substantially free of any bacteria harmful to humans. However, generally in all cases some of the potable water being supplied, is used for irrigation purposes on lawns, greenbelts, shrubs, etc. The production of potable water from rivers and other such sources is expensive, both in terms of the initial treatment of the raw water and in the delivery via pumping stations, pipelines, etc.

No matter what system is used for handling wastewater, during a drought it is not uncommon for municipalities and/or counties to issue water use restrictions. Such restrictions proscribe activities such as watering the lawn, washing the car, etc. The enforcement of these restrictions is difficult. While most dwellings are provided with a water meter or the like to monitor the amount of water entering a dwelling, the amount of water leaving a dwelling remains unknown. Thus, the only way to monitor whether water use restrictions are being followed is to rely on people reporting fellow neighbors for violations or for the municipality/county to assign employees to periodically drive around neighborhoods looking for violations.

What is needed is a system for treatment and re-use of wastewater, primarily residential wastewater, which can reduce the loading on MWS, especially as population grows and/or, new subdivisions are built, etc., reduce the use of potable water by residences, allow re-use of treated wastewater and, reduce environmental impact, especially in the case of the pollution of streams, particularly streams running close or through municipalities. Such a system can also be combined with a system that can monitor the amount of water leaving a house such that improper use and/or leaks in the system can be detected. Thus, the amount of water being reused, the amount being returned to the city, and the amount lost through waste and/or leaks can be determined.

SUMMARY OF THE INVENTION

In one aspect, the present invention provides a system for reusing water.

In another aspect, the present invention provides a system for monitoring water usage in a dwelling.

In still another aspect, the present invention provides a system for reusing water and monitoring the water usage and re-use in a dwelling.

These and further features and advantages of the present invention will become apparent from the following detailed description, wherein reference is made to the figures in the accompanying drawings.

BRIEF DESCRIPTION OF THE DRAWINGS

FIG. 10 is a schematic view of one embodiment of the monitoring system of the present invention connected to a central wastewater system.

FIG. 11 is a schematic view of another embodiment of the monitoring system of the present invention not connected to a central wastewater system.

DETAILED DESCRIPTION OF PREFERRED EMBODIMENTS

Figure 1:
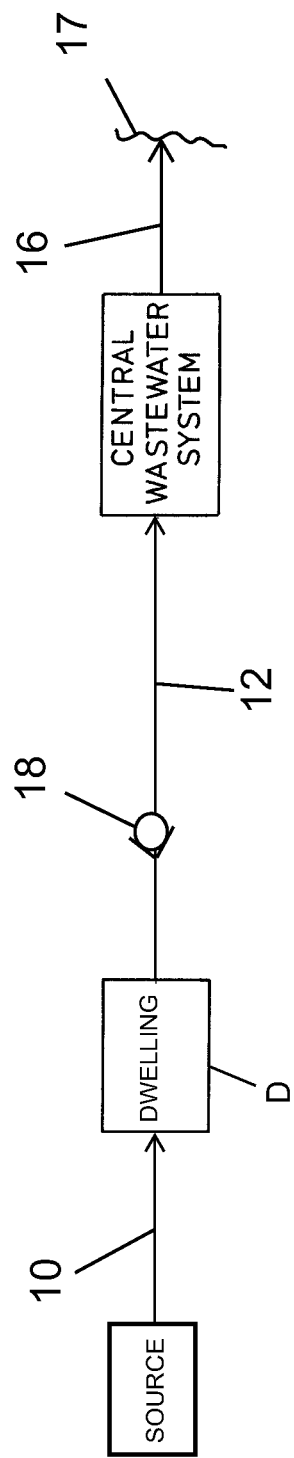
FIG. 1 is a schematic view of a prior art system connected to a central wastewater system.

As used herein the term "solids handling pump" is intended to mean any pump capable of pumping solids whether through openings sufficiently large for the solids to pass or by the use of grinders or the like to break solids down. Accordingly "solids handling pumps" encompass grinder pumps, solids handling pumps, and other pumps well known to those skilled in the art which are capable of pumping solids. The term "septic tank" refers to an on-site subsurface tank and includes anaerobic wastewater treatment. The term "coarse filters" is intended to mean any filter appropriate for use in a wastewater treatment system which filters out solids/particles larger than ⅛ inch. The term "fine filters" is intended to mean any filter appropriate for use in a wastewater treatment system which filters out particles larger than 100 microns. The term "float system" means one or more floats.

The term "low level switch" refers to any apparatus which detects the level of wastewater and either directly or indirectly turns off a pump to prevent the water level from dropping below a certain point. The term "high level switch" refers to any apparatus which detects the level of wastewater and either directly or indirectly turns on a pump to prevent the water level from exceeding a certain point. The scope of the invention is not limited to those specific examples of low and high level switches set forth in the specification.

The term "irrigation system" or variants thereof include underground drip emitter irrigation systems, drain field systems, sprinkler systems, or any other system wherein the treated wastewater is used for enhancing vegetation growth.

The term "municipal wastewater treatment system" or variants thereof is intended to include not only such systems run by a governmental organization but also any wastewater treatment system which is centralized in the sense that a plurality of residences or dwellings are being serviced by the central wastewater treatment system. Thus, for example the term would include such wastewater systems dedicated to a single subdivision or cluster of dwellings which could be run or controlled by the residents employing a "central wastewater treatment system." The term "central water supply system," "central source," or variants thereof includes not only municipal water supply systems run by governmental agencies but also potable water supply sources connected to a plurality of dwellings, e.g., a large water well servicing a plurality of houses. The term "reuse recipient" includes any place, piece of equipment, structure, or the like to which treated wastewater can be sent and, desirably, usefully employed. The term "wastewater" includes wastewater from a dwelling and can refer to water including human waste, i.e., black water, and to water without human waste, i.e., gray water. It further includes wastewater which has been disinfected using any of a variety of disinfection methods.

The term "selectively operable" includes a condition, circumstance or event which happens by virtue of an affirmative action by an entity or thing as well as passively by virtue of an arrangement which allows such condition, circumstance, or event to occur, usually periodically.

Reference numerals are used throughout the following description to identify various elements of the claimed invention. Elements which perform the same function in different embodiments are given the same reference numeral throughout the various embodiments.

Referring first to FIG. 1, there is shown the prior art system, presently in widespread use, for the treatment of wastewater by a central wastewater system. Fresh water from a suitable central source, e.g., a municipal water supply, enters dwelling D via line 10 and is used in a typical manner for bathing, toilets, dishwashing, clothes washing, etc., the used wastewater being discharged from dwelling D through line 12 forming part of a central wastewater collection system and ultimately to an central wastewater system. The treated wastewater from the central wastewater system is typically discharged to a stream 17 or other body of water via line 16. In some instances a check valve 18 is used to prevent back-up of wastewater from line 12 downstream of check valve 18 into dwelling D. As can be seen from FIG. 1, all of the fresh water to dwelling D via line 10 ends up in the central wastewater system, and is not reused.

Figure 2:
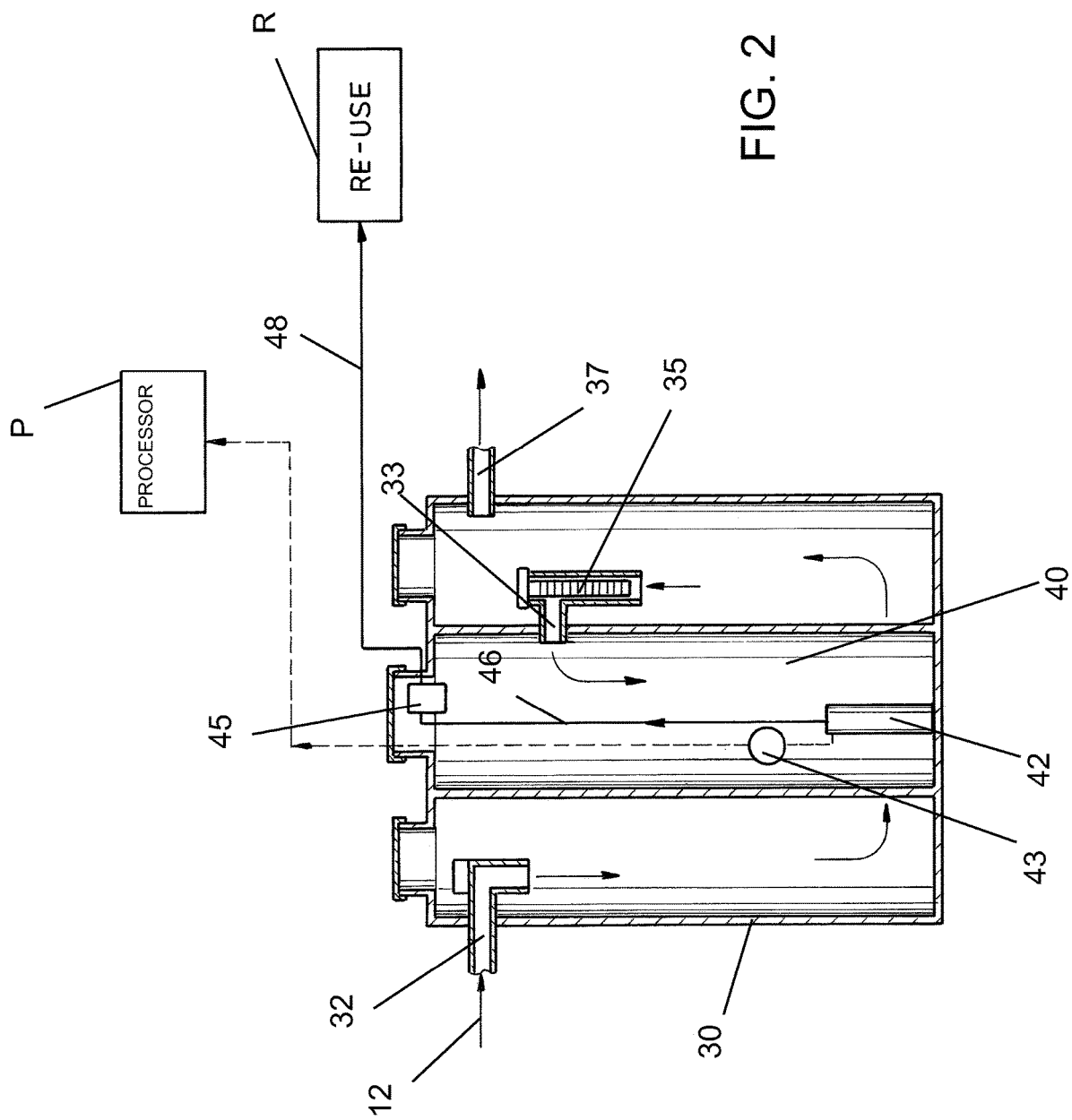
FIG. 2 is a schematic view of one embodiment of the system of the present invention in which water is reused.

Turning now to FIG. 2, there is shown an embodiment of the wastewater reuse system of the present invention in which a portion of the wastewater is reused, e.g., for irrigation or for flushing toilets or the like. The system of FIG. 2 uses concentric tanks 30 and 40. Wastewater from dwelling D (not shown) passes via line 12 into outer settling tank 30 via inlet 32. Wastewater from settling tank 30 passes through passageway 33 into inner pump tank 40. Solids and the like settle out of the wastewater in settling tank 30, but to ensure solids do not pass through to pump tank 40, coarse filter 35 is disposed in passageway 33. As shown in FIG. 2, settling tank 30 must be pumped out occasionally to remove accumulated solids and wastewater from the tank. Settling tank 30 has a gravity overflow outlet 37 leading to central wastewater system 5.

Pump 42 is connected to pump tank 40 and pumps wastewater from pump tank 40 along line 46. The wastewater leaving pump tank 40 is passed via line 48 to a reuse recipient R. Pump 42 is controlled by a low level switch 43 which is in turn connected to processor P. Once the water level in pump tank 40 decreases to a certain level, low level switch 43 will signal processor P which in turn will shut off pump 42. Alternatively, low level switch 43 can comprise a float system which directly controls the operation of pump 42. Low level switch 43 can also comprise a laser sensor which detects when the water level decreases beyond a certain point and signals processor P to turn off pump 42. No matter the exact method of operation, low level switch 43 detects when the wastewater in pump 40 decreases to a certain level and either directly or indirectly turns pump 42 off. This ensures that pump 42 will not continue to pump wastewater out of pump tank 40 if the level of wastewater is too low, thus preventing overheating of and damage to pump 42. If desired, such as in the case of reusing the water for irrigation, a fine filter 45 is disposed between pump 42 and reuse recipient R. The emitters used in irrigation are quite small and easily clogged and fine filter 45 prevents particles larger than 100 microns from passing to the irrigation system.

Figure 3:
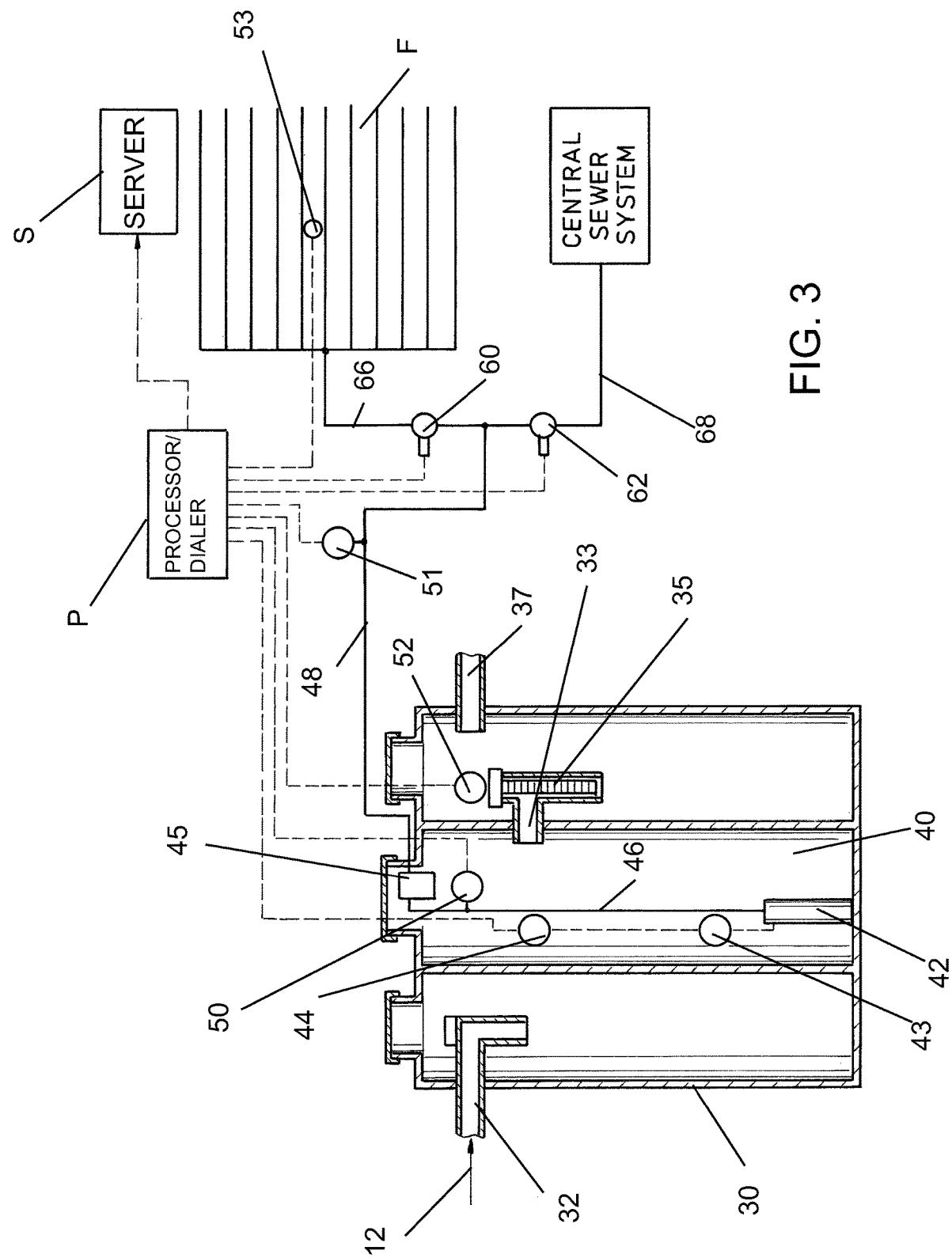
FIG. 3 is a schematic view of another embodiment of the system of the present invention in which water is reused.

FIG. 3 depicts a system similar to that of FIG. 2 but with additional features. As in FIG. 2, the system of FIG. 3 utilizes concentric tanks; outer settling tank 30 and inner pump tank 40. Wastewater enters settling tank 30 from a dwelling (not shown) and solids and the like settle out of the wastewater in settling tank 30. Settling tank 30 includes a gravity overflow outlet 37 as well as an overflow sensor 52 connected to processor P. Processor P thus receives data regarding the passage of wastewater from settling tank 30 through overflow outlet 37. Wastewater passes from settling tank 30 through coarse filter 35 in passageway 33 into pump tank 40. Pump 42, low level switch 43, and fine filter 45, operate as set forth with respect to FIG. 2. The embodiment of FIG. 3 also has a high level switch 44 positioned in pump tank 40. When the water level increases to reach high level switch 44, a signal is transmitted to processor P and processor P turns pump 42 on to pump wastewater to reuse recipient R (shown as irrigation field F). As with low level switch 43, high level switch 44 can be a float switch which directly controls the operation of pump 42, a laser sensor, or any other switch known in the art which will directly or indirectly turn pump 42 on when the water reaches a certain level. Once switched on, pump 42 continues to pump wastewater until the water level decreases to low level switch 43 which, as explained above, signals processor P to turn pump 42 off or directly turns pump 42 off.

It will be understood that the water being pumped to irrigation or drip fields cannot be pumped all at once. The ground being irrigated requires time to absorb the water or else the field will simply become flooded. It is common practice for the pumps to instead pump in timed cycles, also known as doses or batches. Thus water is pumped for a certain number of minutes or in a certain amount and then is stopped for a certain number of minutes to allow for the absorption of the water into the ground. The present invention contemplates such common practices. Thus, pump 42 for example will pump out its wastewater in a series of doses until the low level switch 43 signals the processor to stop the pumping. These doses are contemplated in all embodiments of the present invention when sending water to drip or irrigation fields or the like.

High and low pressure sensors 50 and 51 are connected to lines 46 and 48 respectively in the FIG. 3 embodiment. High pressure sensor 50 is upstream of fine filter 45. Should fine filter 45 become clogged, sensor 50 will detect the resulting increase in pressure and send a signal to processor P. Low pressure sensor 51 is downstream of fine filter 45. A drop in pressure in line 48 signals a leak or break in the line somewhere. Low pressure sensor 51 also sends a signal to processor P. Processor P signals pump 42 to turn off in response to signals from high or low pressure sensors 50 and 51. High and low pressure sensors 50 and 51 can also be connected to alarms to alert the owner, resident, etc. of a problem with the system, e.g., a clog or a leak.

In the FIG. 3 embodiment water can selectively be pumped to a reuse recipient, shown as irrigation field F, or the central sewer system. These dual functions are accomplished by the use of a solenoid valve system comprising at least one solenoid valve. A single solenoid valve connected to processor P can selectively direct water to the central wastewater system and to irrigation field. A typical arrangement is for the solenoid valve to direct water to the irrigation field when the solenoid valve is in the open position. If the moisture sensor indicates sufficient water is on the field, processor P will close the solenoid valve, directing the flow of water to the central wastewater system instead. It is not uncommon for the arrangement to be reversed though, i.e., water flowing to the central wastewater system when the solenoid valve is open and to the irrigation field when the solenoid valve is closed. The solenoid valve system of the present invention can comprise any solenoid valves known those skilled in the art. The embodiment shown in FIG. 3 includes a plurality of solenoids. First solenoid valve 60 is in line 66 and second solenoid valve 62 is in line 68, both solenoid valves being connected to processor P. When it is desired to pump water into irrigation field F, processor P will maintain solenoid valve 60 in an open position, while solenoid valve 62 is in a closed position. Likewise, to pump water to the central sewer system, solenoid valve 62 will be opened and solenoid valve 60 closed.

Also shown in FIG. 3, and preferred for embodiments sending wastewater to an irrigation field F is a moisture sensor 53. When moisture sensor 53 detects sufficient moisture in the ground, e.g., due to a recent rain or the like, and irrigation of the field is not required, moisture sensor 53 will signal processor P which in turn will close solenoid valve 60 and send all wastewater to the central wastewater system. When moisture sensor 53 indicates insufficient moisture in irrigation field F, processor P will open solenoid valve 60 to send the wastewater in timed cycles or doses along line 66 for irrigation purposes. Moisture sensor 53 can also be used to determine the correct doses of wastewater sent to irrigation field F by pump 42. Specifically, moisture sensor 53 detects surfacing of the wastewater, meaning the wastewater has not been absorbed into the ground yet and is staying on the surface. Repeated signals of surfacing from moisture sensor 53 can indicate the doses are too large for the ground and less wastewater should be pumped to the irrigation field in each dose or more time allotted between doses.

It is common practice for wastewater being sent to a surface irrigation field or stream to be disinfected through chlorination or other well known means to destroy potentially harmful bacteria. It will be appreciated that such disinfection means are not required when sending the wastewater to a subsurface irrigation or drip field. Rather, the bacteria present in the wastewater serves to further treat the wastewater through the land to which it is sent. However, it may be desired to perform disinfection steps for wastewater being sent to rocky soil or clay if there is a risk of excess wastewater running off into a stream or passing through the rocky soil to contaminate an aquifer. Disinfection steps may also be taken for wastewater reused in capacities other than irrigation.

FIG. 3 depicts processor P with a dialer which is connected to a server S. The dialer transmits data to the server. The operation of the dialer in connection with the present invention is explained in detail with respect to FIG. 12. In short, processor/dialer P will be connected to a pump operation sensor (see FIG. 12) in turn connected to pump 42. Processor/dialer P receives data regarding the operation of the pump and transmits the pump operation data to server S. This data can be used by the homeowner and/or regulatory agency to determine the amount of water sent to the reuse recipient and the amount of wastewater sent to the central wastewater system.

Figure 4:
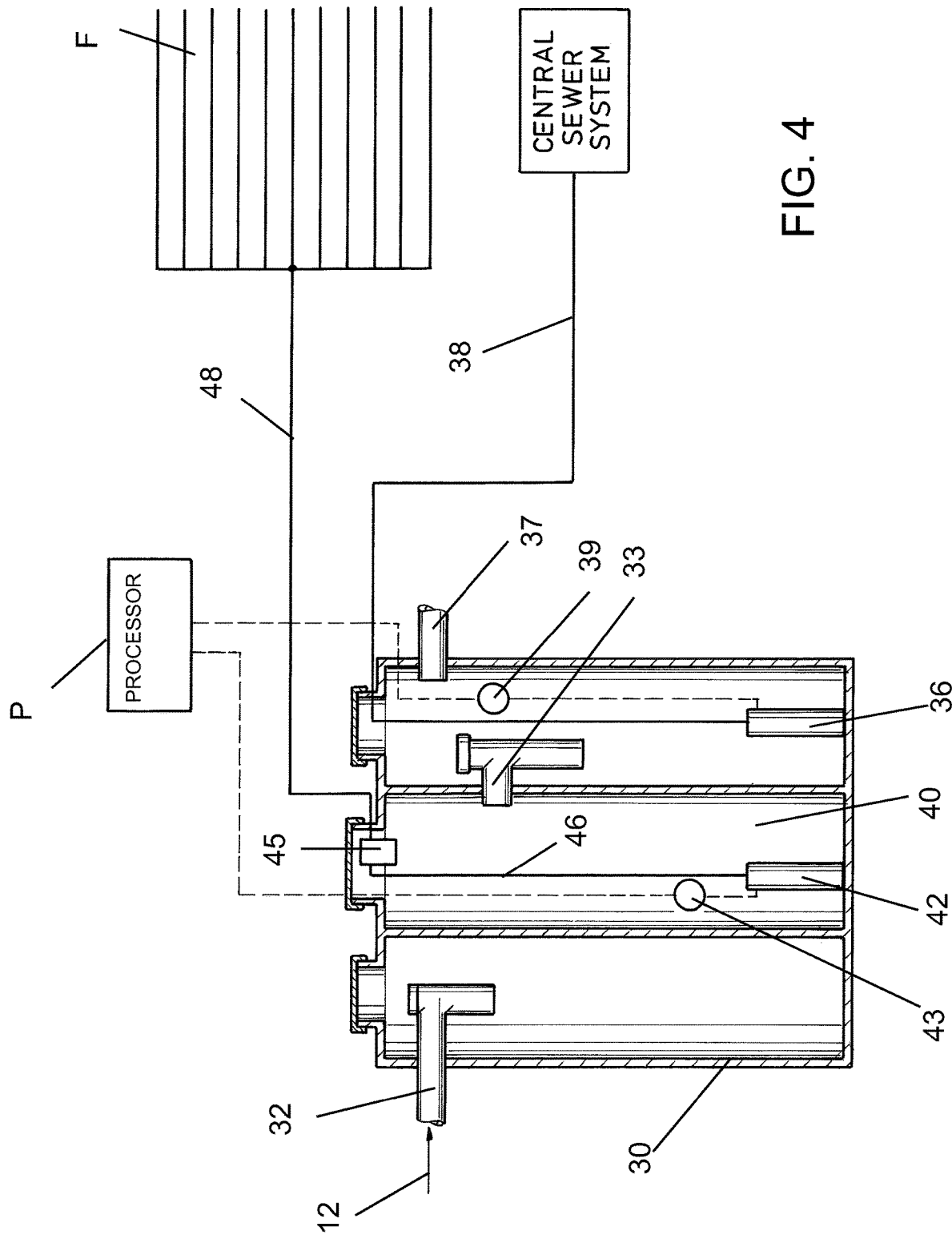
FIG. 4 is a schematic view of another embodiment of the system of the present invention in which water is reused.

Turning now to FIG. 4, there is shown an embodiment similar to that of FIG. 2, however, the FIG. 4 embodiment uses two pumps. Settling tank 30 includes solids handling pump 36 and high level switch 39. When the level of wastewater and solids in settling tank 30 reaches high level switch 39 a signal is sent to processor P which turns solids handling pump 36 on. Solids handling pump 36 pumps the wastewater and solids from settling tank 30 to the central wastewater system via line 38. It will be appreciated that high level switch 39 must be positioned above passageway 33. Wastewater can thus enter passageway 33, pass through coarse filter 35 (not depicted) in passageway 33, and into pump tank 40. Pump 42 in pump tank 40 sends wastewater to irrigation field F via line 48.

Figure 5:
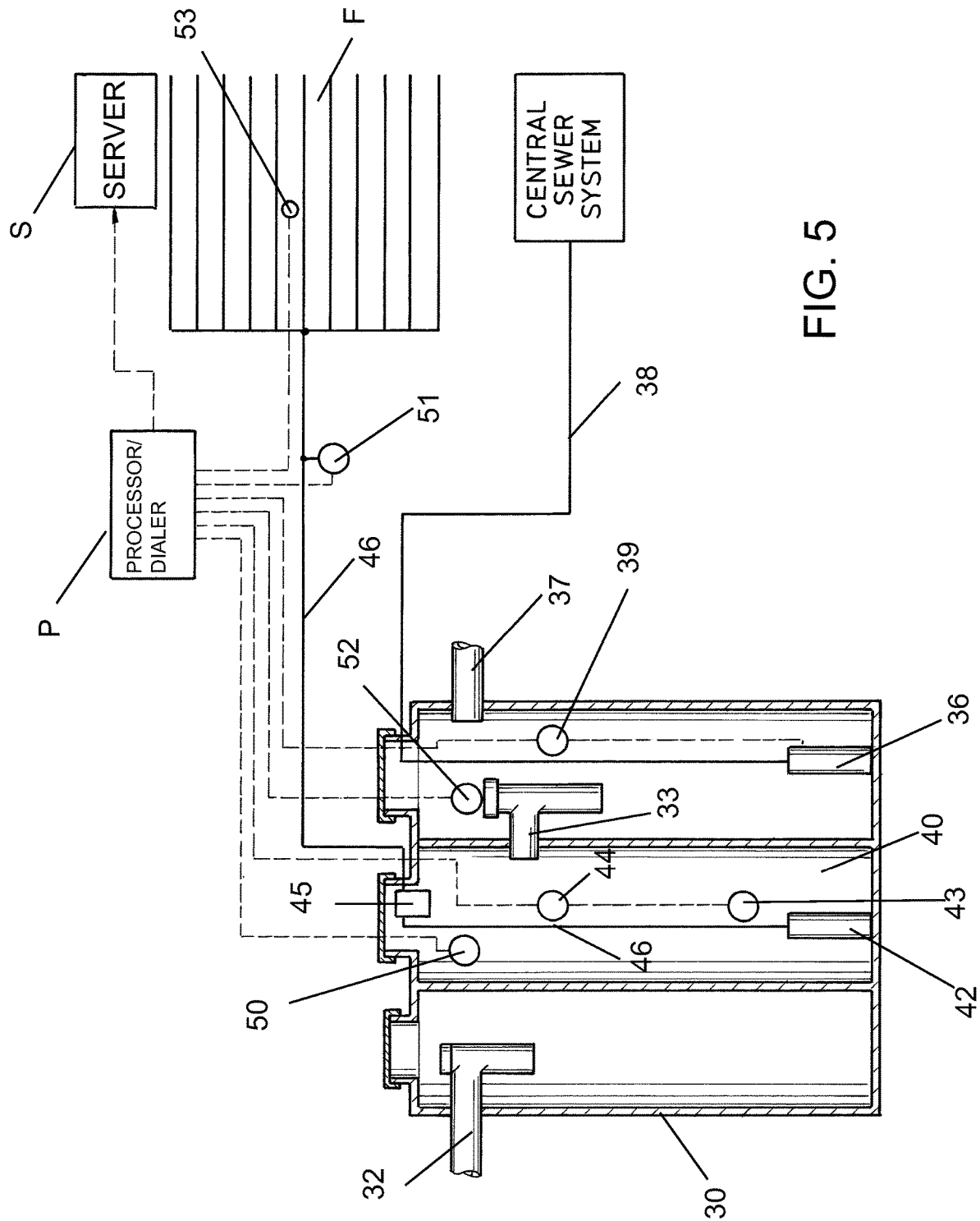
FIG. 5 is a schematic view of another embodiment of the system of the present invention in which water is reused.

FIG. 5 shows a system similar to that of FIG. 4 and includes high level switch 44, high pressure sensor 50, low pressure sensor 51, overflow sensor 52, and moisture sensor 53, the operations of which are explained above with respect to FIG. 3. Wastewater passes from settling tank 30 through coarse filter 35 (not depicted) within passageway 33 into pump tank 40. Wastewater from pump tank 40 is sent to irrigation field F. When the wastewater and solids in settling tank 30 reach high level switch 39, solids handling pump 36 is turned on and pumps wastewater and solids to the central wastewater system. Also shown is the processor/dialer P connected to server S, the operation of which is described fully hereafter.

Figure 6:
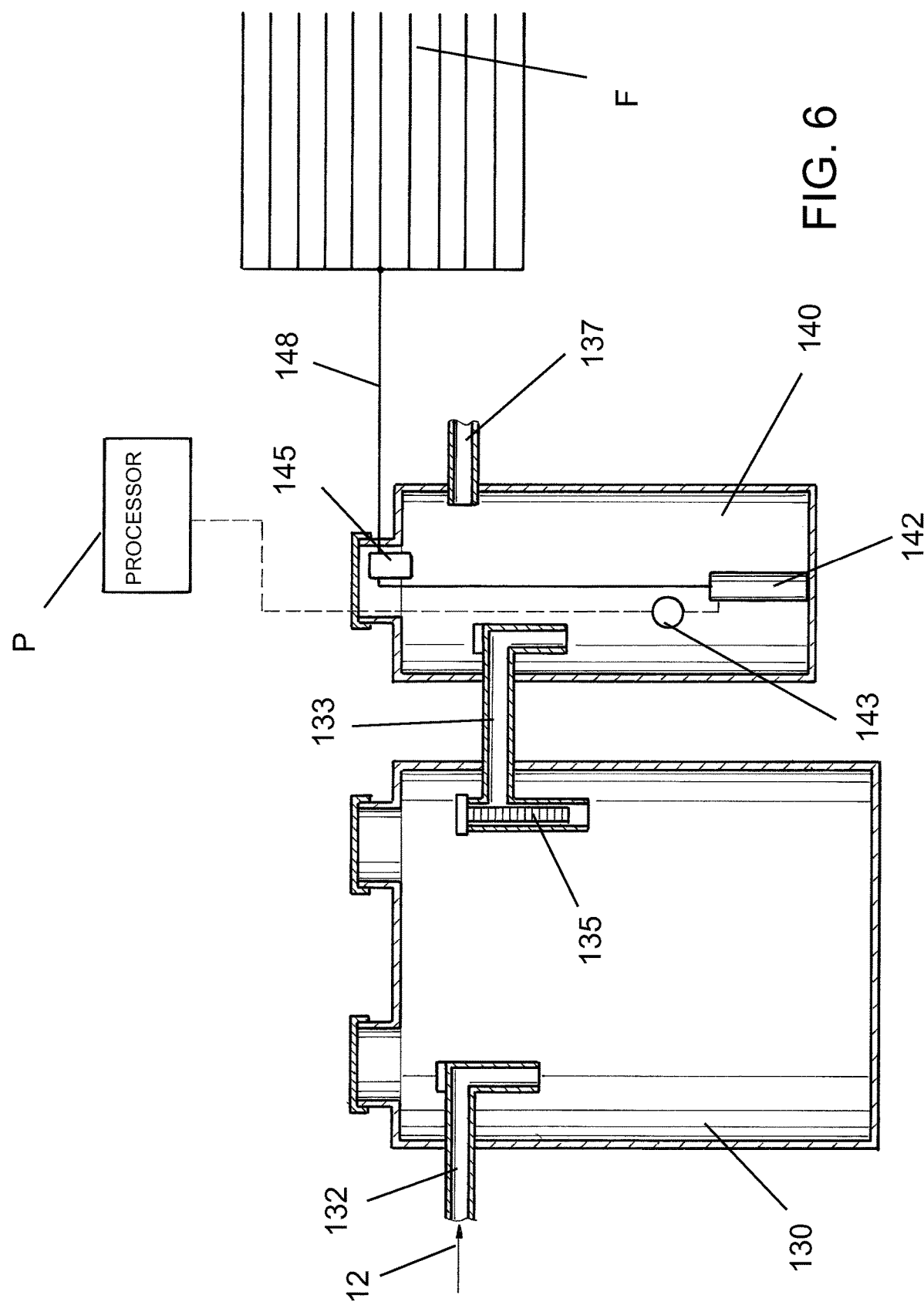
FIG. 6 is a schematic view of another embodiment of the system of the present invention in which water is reused.

Referring now to FIG. 6, there is shown an embodiment of the present invention wherein the tanks are not concentric. Wastewater from dwelling D (not shown) passes via line 12 into settling tank 130 via inlet 132. Wastewater from settling tank 130 passes through passageway 133 into pump tank 140. Solids and the like settle out of the wastewater in settling tank 130, but to ensure solids do not pass through to pump tank 140, coarse filter 135 is disposed in passageway 133. As shown in FIG. 6, settling tank 130 must be pumped out occasionally to remove accumulated solids and wastewater from the tank.

Pump 142 is connected to pump tank 140 and pumps wastewater from pump tank 140 along line 146. The wastewater leaving pump tank 140 is passed via line 148 to a reuse recipient, shown here as irrigation field F. Pump 142 is controlled by a low level switch 143 which is in turn connected to processor P. Once the water level in pump tank 140 decreases to a certain level, low level switch 143 will signal processor P which in turn will shut off pump 142. Alternatively, low level switch 143 can comprise a float system which directly controls the operation of pump 142. Low level switch 143 can also comprise a laser sensor which detects when the water level decreases below a certain point and signals processor P to turn off pump 142. No matter the exact method of operation, low level switch 143 detects when the wastewater in pump 140 decreases below a certain level and either directly or indirectly turns pump 142 off. This ensures that pump 143 will not continue to operate when the level of wastewater is too low, thus preventing overheating of and damage to pump 142. If desired, such as in the case of reusing the water for irrigation, a fine filter 145 is disposed between pump 142 and irrigation field F. Pump tank 140 also has a gravity overflow outlet 137 leading to central wastewater system.

Figure 7:
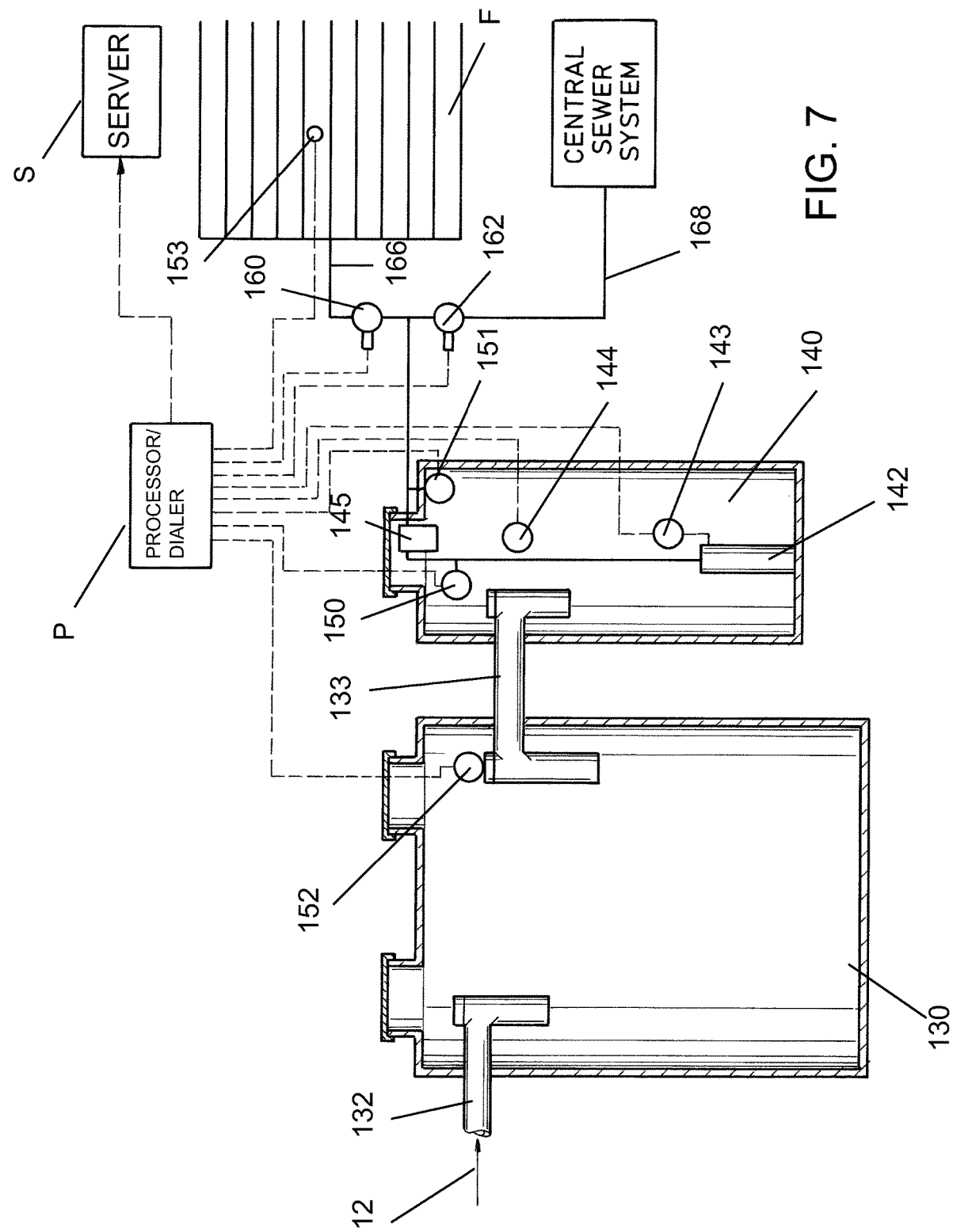
FIG. 7 is a schematic view of another embodiment of the system of the present invention in which water is reused.

FIG. 7 depicts a system similar to that of FIG. 6 but with additional features. As in FIG. 6, the system of FIG. 7 utilizes a series of tanks; settling tank 130 and pump tank 140. Wastewater passes through coarse filter 135 (not shown) in passageway 133 into pump tank 140. Settling tank 130 may also include a gravity flow outlet (not shown) as well as an overflow sensor (not shown) connected to processor P. In addition to pump 142, low level switch 143, and fine filter 45, FIG. 7 shows a high level switch 144 positioned in pump tank 140. When the water level increases to reach high level switch 144, a signal is transmitted to processor P and processor P turns pump 142 on to pump wastewater to irrigation field F. As with low level switch 143, high level switch 144 can be a float switch which directly controls the operation of pump 142, a laser sensor, or any other switch known in the art which will directly or indirectly turn pump 142 on when the water reaches a certain level. Pump 142 continues to pump wastewater until the water level decreases to low level switch 143 which, as explained above, signals processor P to turn pump 142 off or directly turns pump 142 off.

High and low pressure sensors 150 and 151 are connected to lines 146 and 148 respectively. High pressure sensor 150 is upstream of fine filter 145. Should fine filter 145 become clogged, sensor 150 will detect the resulting increase in pressure and send a signal to processor 150. Low pressure sensor 151 is downstream of fine filter 145. A drop in pressure in line 148 would most likely be the result of a leak or break in the line somewhere. Low pressure sensor 151 also sends a signal to processor P. Processor P signals pump 142 to turn off in response to signals from high or low pressure sensors 150 and 151. High and low pressure sensors 150 and 151 can also be connected to alarms to alert the owner, resident, etc. of a problem with the system, e.g., a clog or a leak.

In the FIG. 7 embodiment, water can selectively be pumped to a reuse recipient, shown as irrigation field F, or the central sewer system. These dual functions are accomplished by the use of a solenoid valve system comprising at least one solenoid valve as described above. As shown in FIG. 7, a first solenoid valve 160 is disposed in line 166 and a second solenoid valve 162 is disposed in line 168, both solenoid valves being connected to processor P. When it is desired to pump water into irrigation field F, processor P will maintain solenoid valve 160 in an open position, while solenoid valve 162 is in a closed position. Likewise, to pump water to the central sewer system, solenoid valve 162 will be opened and solenoid valve 160 closed.

Moisture sensor 153 is placed in irrigation field F. In the case where it has rained recently and irrigation of is not required, moisture sensor 153 will signal processor P which in turn will close solenoid valve 160 and send all wastewater to the central wastewater system. When moisture sensor 153 indicates insufficient moisture in irrigation field F, processor P will open solenoid valve 160 to send the wastewater along line 166 in timed cycles or doses for irrigation purposes. Conversely, when moisture sensor 153 detects sufficient moisture in the ground, it will signal processor P to close solenoid valve 160 and open solenoid valve 162. Moisture sensor 153 can also work with the doses of wastewater sent to irrigation field F. Specifically, moisture sensor 153 detects surfacing of the wastewater meaning the wastewater has not been absorbed into the ground.

Figure 8:
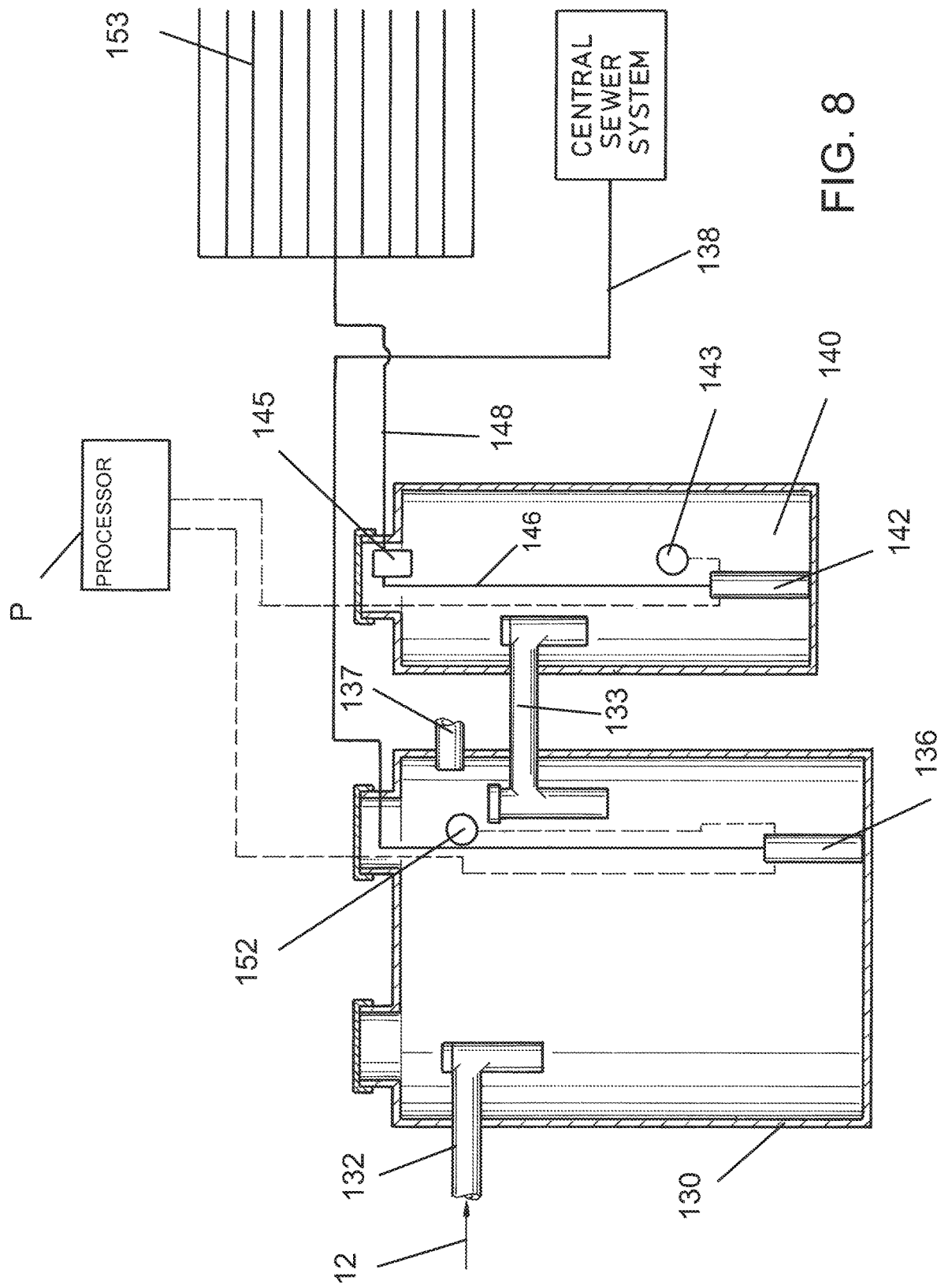
FIG. 8 is a schematic view of another embodiment of the system of the present invention in which water is reused.

Turning now to FIG. 8, there is shown an embodiment similar to that of FIG. 6. However, settling tank 130 now includes solids handling pump 136 and high level switch 139. When the level of wastewater and solids in settling tank 130 reaches high level switch 139 as signal is sent to processor P which turns solids handling pump 136 on. Solids handling pump 136 pumps the wastewater and solids from settling tank 130 to the central wastewater system. It will be appreciated that high level switch 139 must be positioned above passageway 133. Wastewater can thus pass through passageway 133 and coarse filter 135 (not depicted) to pump tank 140. Pump 142 in pump tank 140 sends wastewater to irrigation field F.

Figure 9:
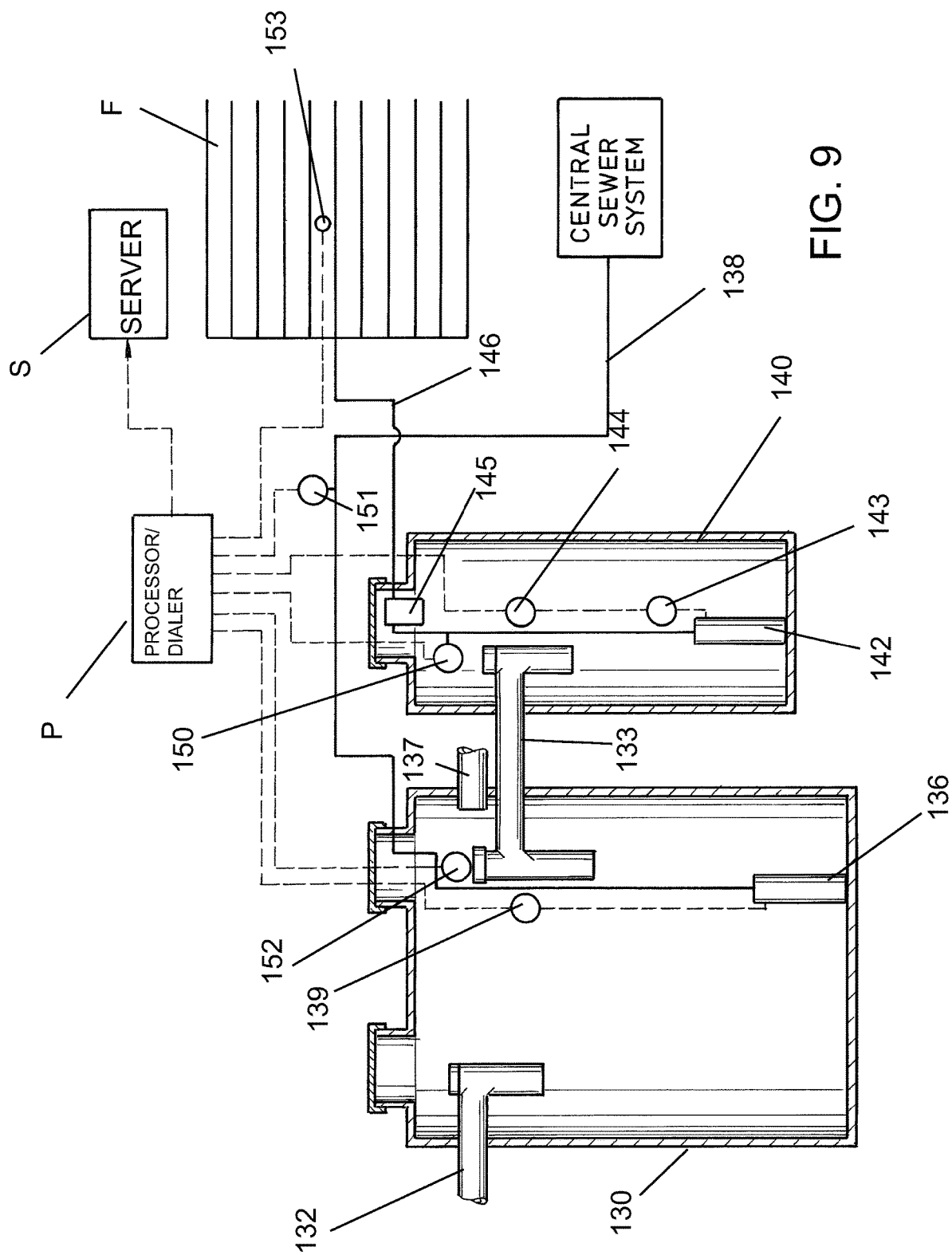
FIG. 9 is a schematic view of another embodiment of the system of the present invention in which water is reused.

FIG. 9 shows a system similar to that of FIG. 8 and further includes high level switch 144, high pressure sensor 150, low pressure sensor 151, overflow sensor 152, and moisture sensor 153, the operations of which are explained above with respect to FIG. 7. Wastewater passes from settling tank 130 through a coarse filter (not depicted) within passageway 133 and into pump tank 140. Wastewater from pump tank 140 is sent to irrigation field F. When the wastewater and solids in settling tank 130 reach high level switch 139, solids handling pump 36 is turned on to pump the wastewater and solids to the central wastewater system. Also shown in FIG. 9 is the processor/dialer P connected to server S, the operations of which are explained in detail hereinafter.

It will be appreciated that while FIGS. 3-9 depict the wastewater reuse recipient as a field to be irrigated, the reuse recipient could be any recipient identified above, including but not limited to a toilet tank.

Another optional component in the system could be a current sensor on the pump to determine if the pump is correctly working. Yet still, in lieu of a current sensor, there could be a pump counter which indicates how many cycles and the length of each cycle the pump has been on over some fixed period of time; e.g., 24 hours. In other words, the pump counter, and in the alternative, the current sensor, would indicate proper functioning of the pump.

It will also be understood that in the systems described above, there are various gauges, controls, floats, sensors, alarms etc., which are used in the ordinary manner of operation of the system.

The choice of which embodiment and which features of the present invention to use depends on a number of factors such as the exact location of the dwelling, type of soil involved, expense, etc. For example, in certain municipal areas, SSS systems would not be acceptable. Additionally, the type of soil may determine the type of system to use. If the soil on which the system is to be placed is sandy, loamy, or otherwise porous, discharge of wastewater to a drain field is acceptable. However, in rocky or hard terrain, such discharge is not acceptable as it could lead to run off into a stream or to pollution of ground water such as in an aquifer.

As noted regardless of which embodiment and features are used, and absent discharge of the treated wastewater to a stream, which is not desirable, there should be sufficient area; e.g., yards, vegetation, greenbelts or the like, that can handle the treated wastewater without the buildup of organic material in the drain field. The present invention solves the latter problem since, even if the drain field or irrigation area is too small, once the moisture sensor signals to processor P that there is sufficient moisture in the ground, the excess treated wastewater can be sent to the central wastewater treatment system.

As discussed above, at least a portion of the treated wastewater can be returned to a residence, commercial establishment, etc. for use in the flushing of toilets. In this regard, some of the treated wastewater could be pumped to a pressure tank, commonly used with water wells, which maintained adequate line pressure for toilet flushing. In this case, it may be desirable or necessary, particularly if a tank type toilet is employed is used, to disinfect the water being used for this purpose prior to recycle to the residence. However, as is well known, particularly in commercial establishments, many bathrooms are equipped with tankless toilets and, accordingly, little if any disinfectant may be required.

In recycling for flushing purposes, if feasible and desired, the treated wastewater could be disinfected and recycled, filtered and recycled, filtered, disinfected and recycled, filtered, disinfected and then introduced into a pressure tank which would maintain line pressure to the residence for flushing purposes.

The addition of recycle for flushing purposes would further minimize the amount of wastewater being discharged to the central wastewater system. Furthermore, in a typical residence, a significant use of potable water is in the flushing of toilets. Accordingly, recycle of the treated wastewater for this purpose would further reduce the use of potable water being used by the residence.

As noted, a desirable optional feature of the systems is a monitoring system, to which any or all of the sensors, floats, timers, etc. could be connected, the monitoring system being of the type which would signal in a suitable manner, that one or more problems is being experienced in the system, and which requires attention. Such a monitoring system could be on a panel board or the like at the residence or, in a more sophisticated system such as described below with respect to FIG. 12, at some centralized, monitoring site, which could be accessed by the homeowner, various regulatory agencies, maintenance companies, etc., to determine not only where a malfunctioning system is located, but the exact nature of the malfunction. Particularly desirable monitoring systems are disclosed and/or claimed in one of the following: U.S. Pat. Nos. 7,149,701; 7,525,420; U.S. Patent Publications 2005/0021359; 2004/0230455; 2007/0021971; 2007/0106525; and 2007/0106527, all of which are incorporated herein by reference.

Turning to FIG. 10 there is shown one embodiment of the monitoring system of the present invention. Unlike the previous embodiments in which the water reuse system is optionally connected to a monitoring system, this system is solely for monitoring water usage and does not include additional treatment or reuse features. As in FIG. 1, fresh water from a suitable central source, e.g., a municipal water supply, enters dwelling D via line 10 and is used in a typical manner for bathing, toilets, dishwashing, clothes washing, drinking, etc. Typically, the used wastewater is discharged from dwelling D through line 12 and ultimately sent to a central wastewater system 5. In accordance with the present invention, positioned along line 12 is a vessel 20 which houses a solids handling pump 25 which transfers the wastewater along line 14 to the central wastewater system. A processor P, including a dialer, is connected to solids handling pump 25. Solids handling pump 25 is connected to a pump operation sensor (shown in FIG. 12) for sensing the operation of solids handling pump 25. Processor P receives data regarding the operation of solids handling pump 25 and transmits it to a server S. The details of the interaction of the pump operation sensor, processor P, and server S operations will be described more fully hereafter (see FIG. 12). The system described above is able to monitor the amount of wastewater leaving dwelling D and being sent to the central wastewater system.

Disposed along line 10 of FIG. 10 is a water meter 15. Processor P is connected to water meter 15 and can thus receive and transmit data regarding the amount of water entering dwelling D. Accordingly, processor P can transmit to server S the amount of water entering dwelling D and the amount of wastewater leaving dwelling D. By determining the difference in the amount of water entering dwelling D (water in) and the amount of water leaving dwelling D (water out), one can determine the amount of water which was not returned, i.e., the water lost through the ground. The appropriate regulatory agency can specify an acceptable amount of difference between the water in and water out, e.g., a percentage, or a number of gallons per a certain time period. Should the difference in between the water in and water out exceed the permitted amount, this could indicate a leak somewhere in the system or it could indicate that the residents of dwelling D are violating water use restrictions, e.g., by watering their lawn or washing their cars. The regulatory agency can then investigate and take proper steps to correct the problem.

Referring now to FIG. 11 there is shown an embodiment similar to that of FIG. 10 except that the system is not connected to a central wastewater system. Rather, dwelling D of FIG. 11 receives fresh, potable water from a well. The water leaving dwelling D is stored in a holding tank or other appropriate vessel 20 and is periodically pumped out using a vacuum truck. In the embodiment shown in FIG. 11, rather than utilize a vacuum truck's vacuum, the wastewater from vessel 20 is pumped into the truck using solids handling pump 25. Again, processor P is connected to solids handling pump 25 and, if desired, to a water meter 15 along line 10. The processor P can thus receive and transmit data regarding the water in and water out of dwelling D.

Figure 12:
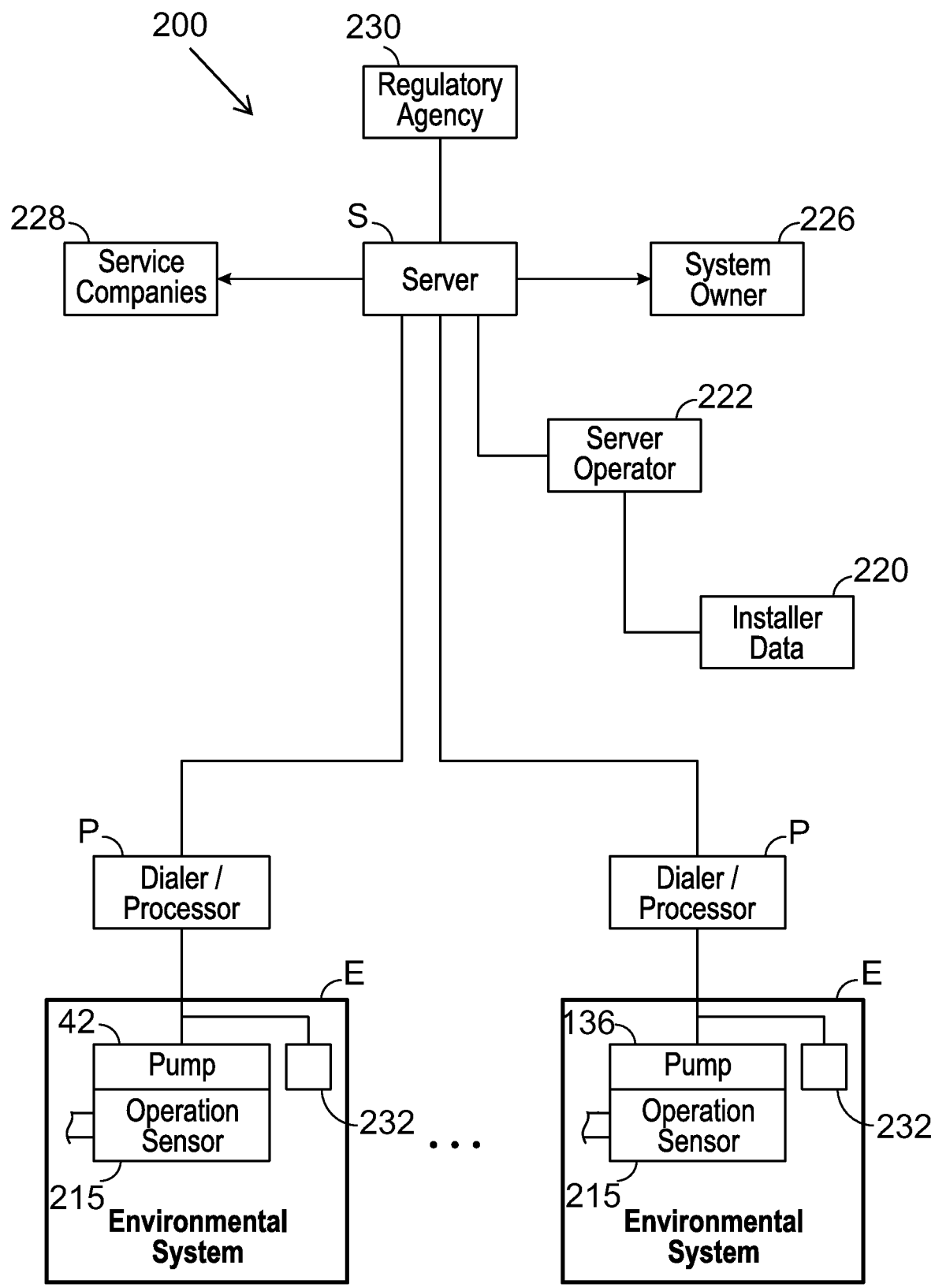
FIG. 12 is a partial schematic view of one embodiment of the processor of the present invention.

Turning now to FIG. 12 there is shown a schematic overview showing the basic interconnection of the processor P, including a dialer, with downstream equipment. In the present invention, a single server may connect to a plurality of processors from a plurality of dwellings forming a sparse data environmental equipment system 200 in accordance with one possible embodiment of the monitoring system of the present invention. System 200 may comprise thousands or tens of thousands or more of environmental systems E that may be widely scattered to make physical monitoring by limited numbers of regulatory personnel difficult or effectively impossible. It will be appreciated that the systems set forth in FIGS. 2-9 above each constitute an example of an environmental system E which can be monitored. Processors P may comprise substantially identical or identical equipment that is programmed substantially identically or identically by the manufacturer that may be referred to herein as universal dialers, universally programmed dialers, standardized dialers, a standardized program, duplicate programs, duplicate software and/or duplicate hardware, duplicate dialers, or the like. In this way, construction is simplified; the same or essentially the same programming is used. In a preferred embodiment, the installers do not need to input data and/or change the programming of the universal dialer/processor P. Installer personnel may or may not also be from service companies or system manufacturers. It will be understood that system 200 is not limited to use of identical dialers/processors and/or identical programming and could accommodate different but suitably programmed dialers that are operable to perform the functions discussed herein. Moreover, the installation may comprise installation of new dialer/processors onto previously installed systems.

Each dialer/processor P is associated with an environmental system as described above. Environmental systems typically comprise one or more pumps with pump operation sensors. Pumps 42 and 136 are depicted in FIG. 12 as examples only. It will be understood that any or all of the pumps described in FIGS. 2-9 may be connected to the dialer/processor P. The pumps are installed using various sizes and lengths of pipes. Due to variations in pipe length and size and/or other factors even identical pumps will have different pump flow rates in different but often otherwise identical environmental systems. Accordingly, even identical systems may have different operating characteristics due to installation factors.

The dialer/processors P comprise at least one processor programmed for uploading pump operation data and/or other data produced by the system, some types of which are discussed subsequently. The dialers may communicate with server 224 over land lines, cellular phone connections, pagers, data lines, power lines, wirelessly or hardwired, or by communication means that are used for data transmission functions. One advantage of the present invention is reduced costs for data transmission due to fewer communications.

Dialer/processors P are also operatively connected to pump operation sensors 215 that detect pump operation. The pump operation sensors 215 may be of many different types. As one example, pump operation sensors 215 may sense when and in some cases how long power is applied to the pump either directly or indirectly.

Pumps may operate for a predetermined time or cycle whereby each cycle may be five minutes, two minutes or the like. If the pump is determined or measured by an installer to pump 100 gallons per minute and each cycle is two minutes, then each cycle would result in 200 gallons of flow. Cycles of pump operation may be based on use of timers, float switches as discussed below, or the like. Accordingly, in one embodiment, universal dialer/processor P detects and sends pump operation data to server S comprising effective time of operation of the pump which may be based on cyclic information, timing the duration of pump operation, or the like. In one embodiment, server S is able to interpret the pump information data from the generic or universal dialer/processor P based on installer data 220, which is site specific information, or installation data, to determine the amount of water leaving a dwelling.

In another embodiment, pump operation sensor 215 may directly detect the time of operation of the pump rather than the number of cycles. In this case, the length of time of operation of pump 42 during the period of interest multiplied by the flow rate of the pump, as measured or estimated by the installer or other personnel, determines the amount of fluid processed by the system.

Dialer/processor P stores the collected data concerning the amount of time of pump operation or number of cycles, which may be referred to herein as pump operation data. Dialer/processor P has enough memory to store data generated by environmental system E for various desired periods of time. The processor may time stamp the pump operation data and/or may organize the data into amounts collected daily or during any desired time period and may place the data in groups based on time periods, time stamps, and so forth. For example, the length of time of pump operation could be provided on a daily or hourly basis or for any other period whereby the amount of water usage is readily determined. Dialer/processor P may be arranged so that subsequent processing by server S can provide daily usage to regulatory agency 230 for the particular system for the last year or for any other time period. Some or all data that is transmitted can be erased to provide more memory for data produced in the future. Some other non-limiting examples of organization of data by a dialer/processor P are discussed in the following: U.S. Pat. Nos. 8,386,303; 7,149,701; 7,525,420; and 7,945,471, all of which are herein incorporated by reference for all purposes.

However, in one embodiment of the present invention the total amount of time or length of time of pump operation data for a specified time period in itself does not determine the amount of fluid processed by an environmental system E because the flow rate of each pump 42 must also be known. After installation or upgrade of an environmental system E, which can also sometimes be referred to as a wastewater treatment system or treatment system E, the installer can measure or estimate the flow rate of the pump to thereby determine a calibration factor or number along which the time of pump operation is utilized to determine the volume of fluid pumped. For example, the flow rate of the pump may be multiplied by the time of operation in a particular time period to obtain the amount of fluid processed by a particular system E for the particular time period. Identical pumps may have different flow rates due the variables in each installation discussed above such as, but not limited to, different size, orientation, configuration, or length pipes. The installer can measure or estimate pump flow rate after the installation is complete so that this information, which is site specific information, and may be referred to as site specific data, installation data, or installer data 220 is known with respect to each environmental system E. Other site specific installer data 220 may comprise a permitted threshold per time period of fluid to be processed, e.g., 1000 gallons per day, locations, pump specifications, manufacturer specification, on site data and the like. Installation data or installer data 220 may not be from an original installer or from an upgrade installer but is typically information relevant to installation or repairs for a specific installation. Accordingly, installation or installer data 220 is data that is site specific and may comprise onsite data manufacturing specifications, on site specifications, or the like. Moreover site specific information or installer data 220 may change over time, e.g., an older pump may not pump as much as the pump did when originally installed.

Accordingly, installers, upgrade personnel, repair personnel or others with site specific information may provide what is often referred to herein as installation data, site specific data or installer data 220 to server operator 222 such as but not limited to the pump flow rate and/or a permitted flow rate per time period for each particular system E. Alternatively, in another embodiment, installation or installer data or site specific data 220 can be sent directly to server S. Installer data or site specific data 220 can be operatively sent by the installer or other personnel to server S by various means including paper forms, online forms, cell phone or work pad applications, and the like. According to the present invention, site specific data or installer data 220 comprises information about a specific site that is used in conjunction with data produced by dialer/processor P to provide useful information to authorized third parties such as the regulatory agencies. In other words, site specific data or installer data 220 is utilized to interpret and/or correct the meaning of the data produced by universal or standardized dialer/processor P by server S without the need to input information or update dialer/processor P with information that is site specific.

As another example of cyclic pump operation, also referred to as dose or batch operation, in one embodiment, pump flow rate information for fluid use by each environmental system E may be provided using a liquid level detector, e.g., one or more float switches that may turn on and off at certain predetermined fluid levels. In this case, the number of times the pump operation sensor 215 detects float switch operation or other liquid level detector operation can be used to determine the volume of fluid pumped assuming the float switches or other liquid level detectors are calibrated to provide this information, which the installer or other service personnel may provide or which may be set for a particular environmental system by the manufacturer. The volume of fluid pumped per cycle is site specific or installer data 220 while the number of reported cycles would be available as data updates from dialer/processor P.

In a preferred embodiment, to minimize the number of calls made by dialer/processor P, the pump operating time data collected by the dialer/processor and other data, some non-limiting types of which have been discussed hereinbefore, is sent to the server periodically rather than immediately after an instance of non-compliant operation of the environmental system is detected. The maximum reporting period can be predetermined and programmed into the dialer/processors P. For example, one presently preferred maximum reporting period is thirty days. When reporting, in one embodiment, at a minimum all data not previously sent to server S can be sent for greater efficiency.

Moreover, the reporting period could be adjusted or set during manufacturing as desired to be longer or shorter than 30 days without the need for the installer to input this information during installation or upgrade. Each dialer/processor P may be programmed by the manufacturer to utilize the same maximum reporting period but could also use different maximum reporting periods. In either case, the number of phone calls for data transmission is limited. However, exceptions to the maximum reporting period for dialer/processor downloading data to server S are discussed below and include reporting whenever predefined events occur.

By using a predetermined maximum time period to report in this embodiment, dialer/processor P can operate without regard to a permitted threshold of processed fluid per time period in accord with the present invention. For example, the maximum time period can be set for 60 days such that the data will be reported no more than 60 days after the last report. Accordingly, in this embodiment, the plurality of universal, identical, standardized, duplicate or substantially identical dialer/processors P do not need any permitted threshold information and/or do not necessarily need flow rate information in order for server S to provide suitable information for regulatory agency 230. Instead, the plurality of dialer/processors P may simply report the recorded pump operation data about the time of operation of each pump 42 for each environmental system E to server S. Server S can then utilize the installer data 220 for each environmental system E, such as the flow rate of the pump, along with the recorded pump operation data from dialer/processors P to determine whether and when any non-compliant operation has occurred for any of the plurality of environmental systems E. Server S can then provide information concerning compliance and lack of compliance to regulatory agency 230, service companies 228, and system owners 226.

The predetermined period for dialer/processors P to send accumulated data to server S limits the number of times data is sent thereby reducing communication costs, which benefits the environmental system owners. However, in a preferred embodiment, various predefined events can also be utilized to trigger an upload of data from the dialer/processors P to server S. As one example, one or more event electronic detectors 232 may detect system problems or activity that requires a response from service companies 228. Many examples of such events are discussed in the previous patents referenced hereinbefore including ongoing readings, which do not return to normal readings within a designated time period, such as high motor current, low motor current, power outage, improper float levels, pH levels, high or low aerator pressure, high or low dissolved oxygen levels, other water treatment parameters, and the like. The occurrence of an event detected by electronic detectors 232 activates programming and operation of the respective dialer/processor P to contact server S.

Other predefined events can include service personnel detected by electronic detectors 232, e.g., as a result of service personnel pushing a button or series of buttons to input a code. If a predefined event occurs for which dialer/processor P is programmed to report to server S, then to reduce the required number of calls, and for the sake of efficiency, the accumulated data will be sent at that time rather than waiting until the predetermined period is over. A new predetermined period, e.g., 30 days, or once a month at a particular time and/or date may then be started after the event that triggered the report so that the times of reporting with respect to the dates can change. Alternatively, the next reporting time may be skipped or delayed and reporting using the same time periods or date of reporting could begin again. Accordingly, the number of communications is limited and cost of data transmission is reduced. The maximum reporting time, which could be in one non-limiting example 30 days from the last reporting, can also be used as a type of heartbeat signal so that if server S does not receive data at an expected time or range of times, then server S may contact a respective service company 228 or homeowner 226 to check on the environmental system.

Server S can provide a history of operation of all environmental systems E to regulatory agency 230, which are overseen by the regulatory agency. As noted above, in one embodiment, server S will have the amount of water entering a dwelling for each environmental system and will be able to calculate and store and/or report the amount of water lost in a desired time period of interest. For example, if the water entering a dwelling is 5000 gallons one week, and the amount of water passing through the environmental system E shows only 2000 gallons, then regulatory agency 230 can be apprised of the significant gap in water in and water out, indicating a leak or improper usage. On this basis, the regulatory agency will have a record upon which to evaluate operation of the system.

As one non-limiting example, server S can generate a report based on selected criteria that shows repeated improper usage of water at a single dwelling based on the history of operation of an environmental system.

The usage per time period can be made available for many different types of already prepared and/or individually tailored reports. The regulatory agency can request reports that are formatted in the desired way, by location or area, by compliance or lack of compliance, by date range, by the severity of non-compliance, repetitive non-compliance problems, and the like. The reports can show usage, e.g., amount of fluid processed, on a daily basis or in any selected time periods. A regulator may want to see only data concerning non-compliance and might select instances of non-compliance for the previous year or years of operation. As well, the regulators may wish to see only data concerning units which are non-compliant by a specified amount, e.g., a difference of more than 25% between the water entering and leaving the dwelling.

Other types of historical data such as alarms, events, service times in response to alarms based on electronic personnel detectors as part of detectors 232, or the like, can also be made available. Accordingly, operation data including volume of wastewater processing, service history, maintenance schedules, and the like can be available from server S. Likewise, other operation data including information about the owners, service contracts, type of environmental system, length of time of operation, and the like can also be available.

Server S communicates with, can be accessed, and/or can send operation data to authorized third parties, which include system owners 226, service companies 228, and regulatory agencies 230. Generally data access is provided by a website and password and any desired method of communication can be utilized including cell phone, cell phone applications, fax, tablet computer, email, radio, or the like. Other examples of ways that authorized third parties and server S communicate with each other can be found in U.S. Pat. Nos. 8,386,303; 7,149,701; 7,525,420; and 7,945,471, all of which are herein incorporated by reference for all purposes.

The appropriate regulatory agency has access to operation data associated the environmental systems E for which it is associated. If more than one regulatory agency 230 is involved then each agency can be limited to accessing data for environmental systems E for which it is associated or authorized. In some cases local agencies or authorities such as subdivision, neighborhood, or the like authorities may perform the oversight and be authorized third parties and could be considered regulatory agencies or agents of regulatory bodies for monitoring purposes. Service companies preferably have their access limited to operation data for the environmental systems for which they are under contract for service. Owners preferably will have access only to operation data for the units which they are responsible for. Access to server S data can be limited by passwords, information encryption keys, and/or other means as desired. Accordingly, authorized third parties include agencies, service companies, and system owners.

Server operator 222 maintains server S, inputs site specific data as necessary, which may include pump rates, permitted threshold levels, and other information necessary to operation of server S, including a wide range of installer data 222. The information and/or programming of server S can be changed or corrected as desired without the need to change programming or input data into individual environmental systems E.

Server operator 222 can utilize server S outputs to check operation of sensors at particular environmental systems E. For example, if a particular environmental system frequently reports overuse in processing, service personnel may check whether the provided flow rates of the pump are correct and if not then this information could be changed at server S rather than dialer/processor P. If a pump processes less or more fluid or has a higher or lower flow rate than the pump did when installed, or if the installer does not measure or estimate the flow rate correctly, or if the flow rate changes over time due to pump or component wear, this site specific information, which is also referred to as installer data herein, can be changed or updated in server S without making changes to dialer/processor P at the particular environmental system E of interest. Accordingly, the present invention more conveniently and efficiently allows for changes to data to be made at server S rather than requiring updates at a specific dialer/processor P.

Accordingly, the present invention may be utilized to provide large amounts of data to regulatory agencies at low cost that verifies environmental safety of operation of tens of thousands small environmental systems.

The system of the present invention allows regulatory agencies to determine the amount of water being used by a dwelling, the amount of water returning to a central wastewater system, and the amount lost through the ground, either due to leaks, lawn watering, or the like. This provides the regulatory agency with better oversight to ensure citizens are compliant with water use restrictions. It also provides them with important information regarding the amount of water being sent to a central wastewater system. A central wastewater system can fail due to too much or not enough water being sent.

The present invention also maximizes the amount of water which is reused and recycled, reduces strain on the central wastewater systems, and improves monitoring to ensure the system operates properly and further reduce waste. The present invention allows municipalities to better manage water resources and thereby benefit the owners/operators, the environment, and the health and safety of members of the community.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A wastewater reuse system comprising:
   a drain line from a facility for transferring wastewater containing human waste comprising solids from said facility to a collection vessel, said collection vessel allowing settling of said solids to produce a reduced solids wastewater;
   a pump vessel in open communication with said collection vessel for receiving said reduced solids wastewater from said collection vessel;
   a pump connected to said pump vessel for transferring said reduced solids wastewater from said pump vessel to a wastewater re-use recipient;
   a processor operatively connected to said pump for selectively turning said pump on and off;
   a pump operation sensor connected to said pump, said pump operation sensor detecting pump operation data comprising one of (a) the number of cycles the pump ran, (b) the amount of time the pump ran, or (c) both (a) and (b), to enable a calculation of the volume of wastewater pumped per unit time; and
   said processor receiving and storing said pump operation data from said pump operation sensor.

2. The system of claim 1, wherein said wastewater re-use recipient comprises a toilet in said facility.

3. The system of claim 1, wherein said wastewater re-use recipient comprises an irrigation system, there being a filter between said pump and said irrigation system.

4. The system of claim 3, further comprising:
   a pressure sensor between said pump and said filter, said pressure sensor being connected to said processor.

5. The system of claim 3, further comprising:
   a pressure sensor downstream of said filter, said pressure sensor being connected to said processor.

6. The system of claim 3, further comprising:
   at least one moisture sensor in the irrigation system and operatively connected to said processor, said processor being operative to turn said pump on or off in response to a signal from said at least one moisture sensor.

7. The system of claim 1, wherein there is a first level sensor in said pump vessel, said first level sensor being operatively connected to said processor, said processor being operative to turn said pump off in response to a signal from said first level sensor.

8. The system of claim 7 wherein there is a second level sensor in said pump vessel, said second level sensor being operatively connected to said processor, said processor being operative to turn said pump on in response to a signal from said second level sensor.

9. The system of claim 1, wherein there is a gravity flow outlet between said collection vessel and a central wastewater collection system.

10. The system of claim 1, wherein there is a high level sensor in said collection vessel, said high level sensor being connected to said processor.

11. The system of claim 1, further comprising:
at least one solenoid valve disposed downstream of said pump tank, said at least one solenoid valve operatively connected to said processor.

12. The system of claim 1, further comprising:
a solids handling pump connected to said collection vessel for transferring wastewater from said collection vessel to a central wastewater collection system.

13. The system of claim 1, wherein said pump vessel is surrounded by said collection vessel.

14. The system of claim 1, wherein said collection vessel is a septic tank.

15. A wastewater reuse and monitoring system comprising:
a drain line from a facility for transferring wastewater containing human waste comprising solids from said facility to a collection vessel, said collection vessel allowing settling of said solids to produce a reduced solids wastewater;
a pump vessel in open communication with said collection vessel for receiving said reduced solids wastewater from said collection vessel;
a first filter between said collection vessel and said pump vessel;
a pump connected to said pump vessel for transferring said reduced solids wastewater from said pump vessel to a wastewater re-use recipient;
a processor operatively connected to said pump for selectively turning said pump on and off;
a pump operation sensor connected to said pump, said pump operation sensor detecting pump operation data comprising one of (a) the number of cycles the pump ran, (b) the amount of time the pump ran, or (c) both (a) and (b), to enable a calculation of the volume of wastewater pumped per unit time;
said processor receiving and storing said pump operation data from said pump operation sensor; and
a server for receiving said pump operation data from said processor.

16. The system of claim 15, wherein said processor comprises a universal dialer which communicates with said server.

17. The system of claim 16, wherein said universal dialer communicates with the server by one of land lines, cellular phone connections, pagers, data lines, power lines, wirelessly, hard wired, or other communication means used for data transmission functions.

18. The system of claim 15, wherein said server selectively provides an authorized party with said pump operation data.

19. The system of claim 15, wherein said wastewater re-use recipient comprises a toilet in said facility.

20. The system of claim 15, wherein said wastewater re-use recipient comprises an irrigation system, there being a second filter between said pump and said irrigation system.

21. The system of claim 20, further comprising:
a pressure sensor between said pump and said second filter, said pressure sensor being connected to said processor.

22. The system of claim 20, further comprising:
a pressure sensor downstream of said second filter, said pressure sensor being connected to said processor.

23. The system of claim 20, further comprising:
at least one moisture sensor in the irrigation system and operatively connected to said processor, said processor being operative to turn said pump on or off in response to a signal from said at least one moisture sensor.

24. The system of claim 15, wherein there is a first level sensor in said pump vessel, said first level sensor being operatively connected to said processor, said processor being operative to turn said pump off in response to a signal from said first level sensor.

25. The system of claim 24, wherein there is a second level sensor in said pump vessel, said second level sensor being operatively connected to said processor, said processor being operative to turn said first pump on in response to a signal from said second level sensor.

26. The system of claim 15, wherein there is a gravity flow outlet between said collection vessel and a central wastewater collection system.

27. The system of claim 26, wherein there is a high level sensor in said collection vessel, said high level sensor being connected to said processor.

28. The system of claim 15, further comprising:
at least one solenoid valve disposed downstream of said pump tank, said at least one solenoid valve operatively connected to said processor.

29. The system of claim 15, further comprising:
a solids handling pump connected to said collection vessel for transferring wastewater from said collection vessel to a central wastewater collection system.

30. The system of claim 29, wherein said processor has a sensor connected to said solids handling pump for detecting solids handling pump operation data, said processor transmitting said solids handling pump operation data to said server.

31. The system of claim 15, wherein there is at least one of a solenoid valve, a moisture sensor, a pressure sensor, second pump, or any combination thereof in said system, and said processor is operatively connected to said at least one solenoid valve, moisture sensor, pressure sensor, second pump, or any combination thereof, wherein said processor has at least one sensor to detect operation data from said at least one solenoid valve, moisture sensor, pressure sensor, second pump, or any combination thereof, and said processor transmits said operation data to said server.

32. The system of claim 31, wherein said processor comprises a universal dialer which communicates with the server.

33. The system of claim 32, wherein said universal dialer communicates with the server by one of land lines, cellular phone connections, pagers, data lines, power lines, wirelessly, hard wired, or other communication means used for data transmission functions.

34. The system of claim 31, wherein said server selectively provides an authorized party with said operation data.

35. The system of claim 15, wherein said pump vessel is surrounded by said collection vessel.

36. The system of claim 15, wherein said collection vessel is a septic tank.

37. A water use monitoring system comprising:
a drain line from a facility for transferring wastewater containing human waste comprising solids from said facility;
a vessel for receiving said wastewater from said drain line;
a solids handling pump connected to said vessel for transferring wastewater from said vessel to a wastewater recipient;
a processor operatively connected to said solids handling pump for selectively turning said solids handling pump on and off;
a solids handling pump operation sensor connected to said solids handling pump, said solids handling pump operation sensor detecting solids handling pump operation data comprising one of (a) the number of cycles the solids handling pump ran, (b) the amount of time the solids handling pump ran, or (c) both (a) and (b), to enable a calculation of the volume of wastewater pumped per unit time;

said processor receiving and storing said solids handling pump operation data from said solids handling pump operating sensor; and a server for receiving said solids handling pump operation data from said processor.

38. The system of claim 37, further comprising:
a feed line for transferring potable water from a potable water source to said facility;
a water meter connected to said feed line, said processor being operatively connected to said water meter, said processor having a sensor operatively connected to said water meter for detecting water meter operation data, said processor transmitting said water meter operation data to said server.

39. The system of claim 37, further comprising:
a first level sensor in said vessel, said first level sensor being connected to said processor, said processor being operative to turn said solids handling pump on or off in response to a signal from said first level sensor.

40. The system of claim 37, wherein said wastewater recipient is a central wastewater collection system.

41. The system of claim 37, wherein said wastewater recipient is a wastewater collection vehicle.

42. The system of claim 37, wherein said processor comprises a universal dialer which communicates with the server.

43. The system of claim 42, wherein said universal dialer communicates with the server by one of land lines, cellular phone connections, pagers, data lines, power lines, wirelessly, hard wired, or other communication means used for data transmission functions.

44. The system of claim 42, wherein said server selectively provides an authorized party with said solids handling pump operation data.

45. A wastewater reuse and monitoring system comprising:
a drain line from a facility for transferring wastewater comprising solids from said facility to a collection vessel, said collection vessel allowing settling of said solids to produce a reduced solids wastewater;
a pump vessel in open communication with said collection vessel for receiving said reduced solids wastewater from said collection vessel;
a pump connected to said pump vessel for transferring said reduced solids wastewater from said pump vessel to a wastewater re-use recipient;
a processor operatively connected to said pump for selectively turning said pump on and off;
a pump operation sensor connected to said pump, said pump operation sensor detecting pump operation data comprising one of (a) the number of cycles the pump ran, (b) the amount of time the pump ran, or (c) both (a) and (b), to enable a calculation of the volume of wastewater pumped per unit time;
said processor receiving and storing said pump operation data from said pump operation sensor; and
a server for receiving said pump operation data from said processor.

46. The system of claim 1, wherein said reduced solids wastewater passes from said collection vessel into said pump vessel by gravity.

* * * * *